Patented Apr. 24, 1928.

1,667,336

UNITED STATES PATENT OFFICE.

THÉODORE VOLTZ, OF BASEL, SWITZERLAND, ASSIGNOR TO DURAND & HUGUENIN S. A., OF BASEL, SWITZERLAND.

CHLORINATED AMINES FROM CHLORINATED HYDROAROMATIC KETIMINO COMPOUNDS AND PROCESS OF MAKING SAME.

No Drawing. Application filed May 21, 1923, Serial No. 640,554, and in Germany June 3, 1922.

In a previous application for Letters Patent Serial No. 621,095, filed Febraury 24, 1923, there are described highly chlorinated hydro-aromatic products containing nitrogen.

According to the present invention these bodies can be reduced and the reaction can be so conducted that all the nitrogen remains in the molecule so that chlorinated amines are produced. It is essential that hydrolysis should be avoided as much as possible. Since, however, the chloroketimines of the said application are relatively stable bodies which only when standing with mineral acids or when boiled with such acids are transformed into the corresponding ketones, the reduction produces good yields of amine even when conducted in presence of acids provided that the reduction takes place rapidly. The final product of the reduction depends on the reducing agent which has been used. Strong reducing agents such as zinc and hydrochloric acid have a greater tendency to remove chlorine atoms than feeble reducing agents. Among such feeble agents a solution of calcined sodium sulfide in ethyl or methyl alcohol has been observed to act particularly well; where this agent is still too strong, alcohol alone can be used. The chlorinated amines, which are obtained in good yield are partly new bodies, such as for instance 2:3:4-trichloro-1-naphthylamine which melts at 162° C.; 1:3-dichloro-2-naphthylamine, which melts at 93.5° C. (perhaps it may be the 3:4-dichloro-2-naphthylamine); 2:3:4-trichloro-1-aminoanthraquinone which melts at 210° C.; and a dichloro-1-amino-anthraquinone, which melts at 204° C.

In the case of the known compounds the invention provides for a simpler method of production.

Pentachloraniline has hitherto been obtainable only in a very roundabout way (Berichte vol. 43, page 2753), whereas according to the present invention large quantities of this product can be obtained in a pure form and in a short time from cheap parent materials. The same applies to 2:3:4:6-tetrachloraniline. Also the 1:3:4-trichloro-2-naphthylamine described by Claus (Journal für Praktische Chemie, vol. 57, page 1) is obtained advantageously according to the invention.

The following examples illustrate the invention:—

1. Hexachloro-chloroketiminotetrahydrobenzene, the exact constitution whereof is 2:2:3:4:4:6-hexachloro-1-chloroketimino-1:2:3:4-tetrahydrobenzene, is dissolved in methyl alcohol and the solution is run into a saturated solution of sodium sulfide in methyl alcohol. When the reaction is complete water is added, whereby the tetrachloraniline is precipitated. It may be re-crystallized from light petroleum. The reaction in this example takes place according to the following formula:

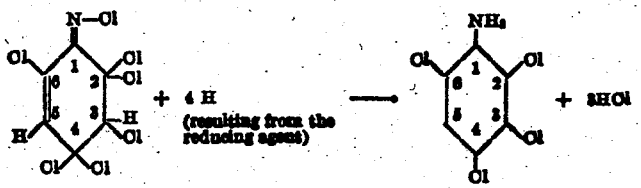

2. Octochloro-chloroketiminohexahydrobenzene, the exact constitution whereof is 2:2:3:4:4:5:6:6-octochloro-1-chloroketiminohexahydrobenzene, is reduced as described in Example 1. Pentachloraniline is obtained with a yield of about 90 per cent. The reaction in this example takes place according to the following formula:

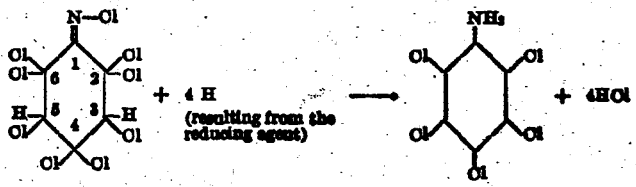

3. 250 grams of calcined sodium sulfide are dissolved in hot alcohol and the solution is filtered and cooled down. A quantity of sodium sulfide crystallizes and the same is left in the solution. The latter is maintained at a temperature of 30° C., while 200 grams of pentachloro-2-chloroketiminotetrahydronaphthalene, the exact constitution of which is 1:1:3:3:4-pentachloro-2-chloroketimino-1:2:3:4-tetrahydronaphthalene, are introduced in small portions. When the reaction is complete the mixture is again heated on the water-bath. The solution is now mixed with water, whereby the amine is precipitated and any naphthol which may have been formed remains in the solution. The precipitate is dried and recrystallized from benzene. The yield is about 90 per cent of pure 1:3:4-trichloro-2-naphthylamine. The reaction in this example takes place according to the following formula:

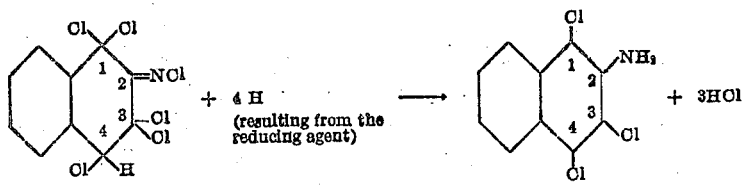

4. The 1-chloroketimino derivative is substituted for the 2-derivative in Example 3. In this case 2:3:4-trichloro-1-naphthylamine in good yield is obtained according to the following formula:

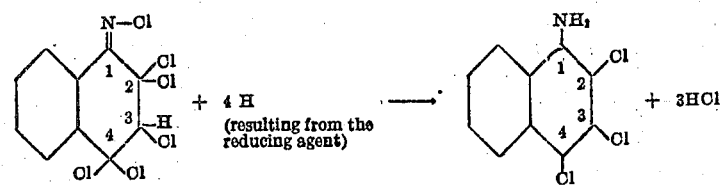

5. Pentachloro-2-chloroketiminotetrahydronaphthalene, the exact constitution whereof is 1:1:3:3:4-pentachloro-2-chloroketimino-1:2:3:4-tetrahydronaphthalene, is dissolved in methyl alcohol and hydrochloric acid and zinc dust are added alternately in small portions to the solution. When the reaction is complete the mixture is filtered and water is added to the filtrate, whereby the amine containing some naphthol is precipitated. The naphthol may be removed by means of sodium carbonate. The dried amine is recrystallized from methyl alcohol. The yield of dichloro-2-naphthylamine amounts to about 78 per cent of that theoretically possible. The reaction in this example takes place according to the following formula:

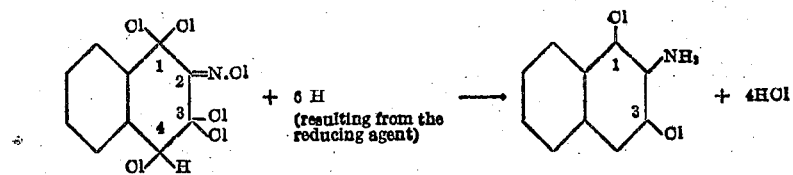

6. Pentachloro-1-chloroketiminotetrahydroanthraquinone, the exact constitution of which is 2:2:3:4:4-pentachloro-1-chloroketimino-1:2:3:4-tetrahydroanthraquinone, is boiled in alcohol for several hours on the reflow cooler. A good yield of 2:3:4-trichloro-1-aminoanthraquinone in pure form is obtained according to the following formula:

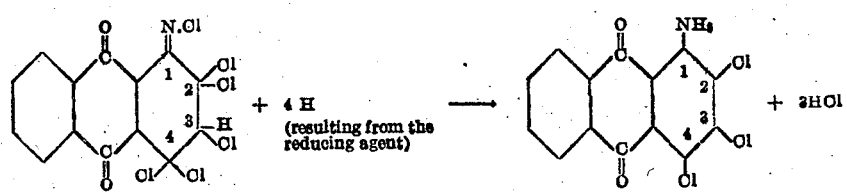

The product obtained is a brick red crystalline powder which is soluble in hot glacial acetic acid and melts at 240° C.

7. Pentachloro-1-chloroketiminotetrahydroanthraquinone, the exact constitution of which is 2:2:3:4:4-pentachloro-1-chloroketimino-1:2:3:4-tetrahydroanthraquinone, is introduced in small portions into a solution of stannous chloride and of hydrogen chloride dissolved in methyl alcohol. When the reaction is complete the mixture is brought to a boil, the amine precipitated by addition of water and purified from hydroxyl derivative by treatment with a sodium carbonate solution. The dichloro-1-aminoanthraquinone is recrystallized from benzene. The reaction in this example takes place according to the following formula:

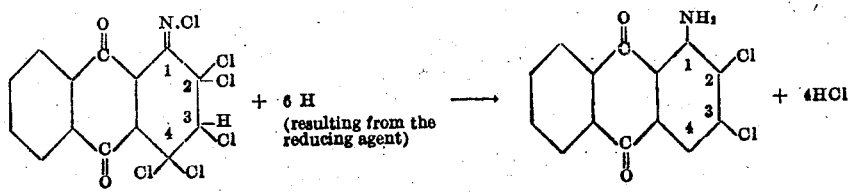

What I claim is:

1. A process for the manufacture of chlorinated aromatic amines, consisting in treating a hydroaromatic benzene derivative containing nitrogen in the form of a chlorinated ketimino group and having in the same hydroaromatic nucleus most of the hydrogen atoms substituted by chlorine, with a reducing agent at a moderate temperature and so far as possible with exclusion of water and strong acids.

2. A process for the manufacture of chlorinated aromatic amines, consisting in treating a hydroaromatic benzene derivative containing nitrogen in the form of a chlorinated ketimino group and having in the same hydroaromatic nucleus most of the hydrogen atoms substituted by chlorine, with a feeble reducing agent at a moderate temperature and so far as possible with exclusion of water and strong acids.

3. A process for the manufacture of chlorinated aromatic amines, consisting in treating a hydroaromatic benzene derivative containing nitrogen in the form of a chlorinated ketimino group and having in the same hydroaromatic nucleus most of the hydrogen atoms substituted by chlorine, with an alcoholic sulphide solution at a moderate temperature and so far as possible with exclusion of water and strong acids.

4. A process for the manufacture of 2:3:4-trichloro-1-aminoanthraquinone, consisting in treating 2:2:3:4:4-pentachloro-1-chloroketimino-1:2:3:4-tetrahydroanthraquinone with a feeble reducing agent at a moderate temperature and so far as possible with exclusion of water and strong acids.

5. As a new article of manufacture the hereinbefore described 2:3:4-trichloro-1-aminothraquinone obtained by treating 2:2:3:4:4-pentachloro-1-chloroketimino-1:2:3:4-tetrahyroanthraquinone with a feeble reducing agent at a moderate temperature and so far as possible with exclusion of water and strong acids, said body forming a brick red cristalline powder soluble in hot glacial acetic acid and melting at 240° C.

In witness whereof I have hereunto signed my name this 8th day of May 1923.

THÉODORE VOLTZ.